United States Patent [19]

Gross

[11] 4,274,725
[45] Jun. 23, 1981

[54] DEPTH OF FIELD OBJECTIVE

[76] Inventor: Walter O. Gross, Lausanne, Switzerland

[21] Appl. No.: 868,707

[22] Filed: Jan. 11, 1978

Related U.S. Application Data

[63] Continuation of Ser. No. 656,607, Feb. 12, 1976, abandoned.

[30] Foreign Application Priority Data

Mar. 13, 1975 [DE] Fed. Rep. of Germany ....... 2510941

[51] Int. Cl.³ ............................................... G03B 3/00
[52] U.S. Cl. .................................................. 354/196
[58] Field of Search ........................ 354/195, 196, 198

[56] References Cited

U.S. PATENT DOCUMENTS 3,014,416 12/1961 Hofmann .............................. 354/196

FOREIGN PATENT DOCUMENTS 1077963 3/1960 Fed. Rep. of Germany ........... 354/195
1813457 12/1968 Fed. Rep. of Germany ........... 354/195
517314 2/1972 Switzerland .

Primary Examiner—John Gonzales
Attorney, Agent, or Firm—Peter K. Kontler

[57] ABSTRACT

The present invention relates to an objective for still cameras and motion picture cameras into which the critical focusing values of the two boundary points of a selected depth of field range are fed without being examined, whereupon the lenses and the diaphragm are adjusted automatically for a sharp reproduction of the respective range.

7 Claims, 2 Drawing Figures

DEPTH OF FIELD OBJECTIVE

This is a continuation, of application Ser. No. 656,607, filed Feb. 12, 1976, now abandoned.

BACKGROUND OF THE INVENTION

For a more accurate depth of field photography, the user of the camera normally relies on the depth of field scale. The operation involves the following six steps, one after the other: (a) Focusing one boundary point of the desired depth of field range. (b) Reading and memorizing the selected distance. (c) Focusing the other boundary point. (d) Reading and memorizing this second selected distance. (e) Rotating the focusing ring until the two memorized distances face the same stop numbers of the depth of field scale. (f) Adjusting the diaphragm in accordance with these stop numbers.

My Swiss Pat. No. 517,314 discloses a camera embodying a device which automatically performs the aforediscussed series of manipulations. No satisfactory construction of an objective which can carry out such manipulations is known as yet. However, the automatic exposure time device which is disclosed on page 3, lines 6 and 7 of the Swiss Patent has been incorporated in the meantime in at least 16 modern cameras. Moreover, there are many additional proposals relating to automated focusing aids. When photographing, only the selection of depth of field would still require manual adjustment including the four steps b, d, e and f during which the camera is not trained upon the subject or scene. Therefore, there exists a need for an objective which is capable of carrying out these manipulations in an automatic way.

OBJECTS AND SUMMARY OF THE INVENTION

An object of the present invention is to provide an objective of the type indicated hereinbefore, namely, an objective wherein the depth of field is automatically adjusted upon transmission of information pertaining to the two boundary points. Thus, instead of the aforesaid complex operations, the photographer is required to carry out only the two steps of determining the boundaries of the depth of field range. In other words, the photographer is still free to select the object even if focusing itself is automated.

Another object of the invention is to provide the objective with a device which can select the same depth of field position as is accomplished by the aforementioned six steps. This involves the movement of the lens mount to an intermediate position between the positions corresponding to the two focused boundary points and a corresponding adjustment of the diaphragm. During the step e, the lens system is shifted away from the position of focusing upon the second boundary point and, when the two distances denoting the selected boundary points face the same f/stop numbers of the depth of field scale, the lens system reaches precisely a position midway between the two boundary focus positions, as considered in the direction of the optical axis. Consequently, the step e involves moving the lens system exactly by half the distance it had to be advanced from focusing of the farthest boundary point to that of the nearest boundary point, or vice versa.

A further object of the invention is to provide a method and a device which automatically accomplish the aforediscussed forward and rearward movements of the lens system within an objective regardless of whether the information pertaining to the two boundary points is supplied manually (e.g., by depressing suitable keys) or automatically.

During the step f, that diaphragm aperture size is selected which is indicated by the two distances focused out on the depth of field scale. This aperture size has a specific relationship to the total focusing difference. When the stray circle diameter is based upon a specific millimeter fraction, the maximum focusing difference is defined by the distance which is indicated by the depth of field scale as converted torque between the pairs of the greatest f/stop numbers. Smaller f/stop numbers are associated with the correspondingly smaller focusing differences.

The present invention embraces all methods and devices which adjust the diaphragm automatically in accordance with the focusing differences within an objective in response to feeding of information by means of a key or in response to automatic feeding.

The shifting of the lens mount to a position midway between the positions assumed during focusing upon the two boundary points is derived from the movement which the objective had to carry out between the said positions. According to the invention, adjustment of the diaphragm is derived from the movement of the lens system.

DESCRIPTION OF THE PREFERRED EMBODIMENTS

For the sake of simplicity, the device which embodies the invention will be described as though the farthest boundary point were focused first. However, the improved device can also operate in such a way that the nearest boundary point is focused first.

Figure 1:
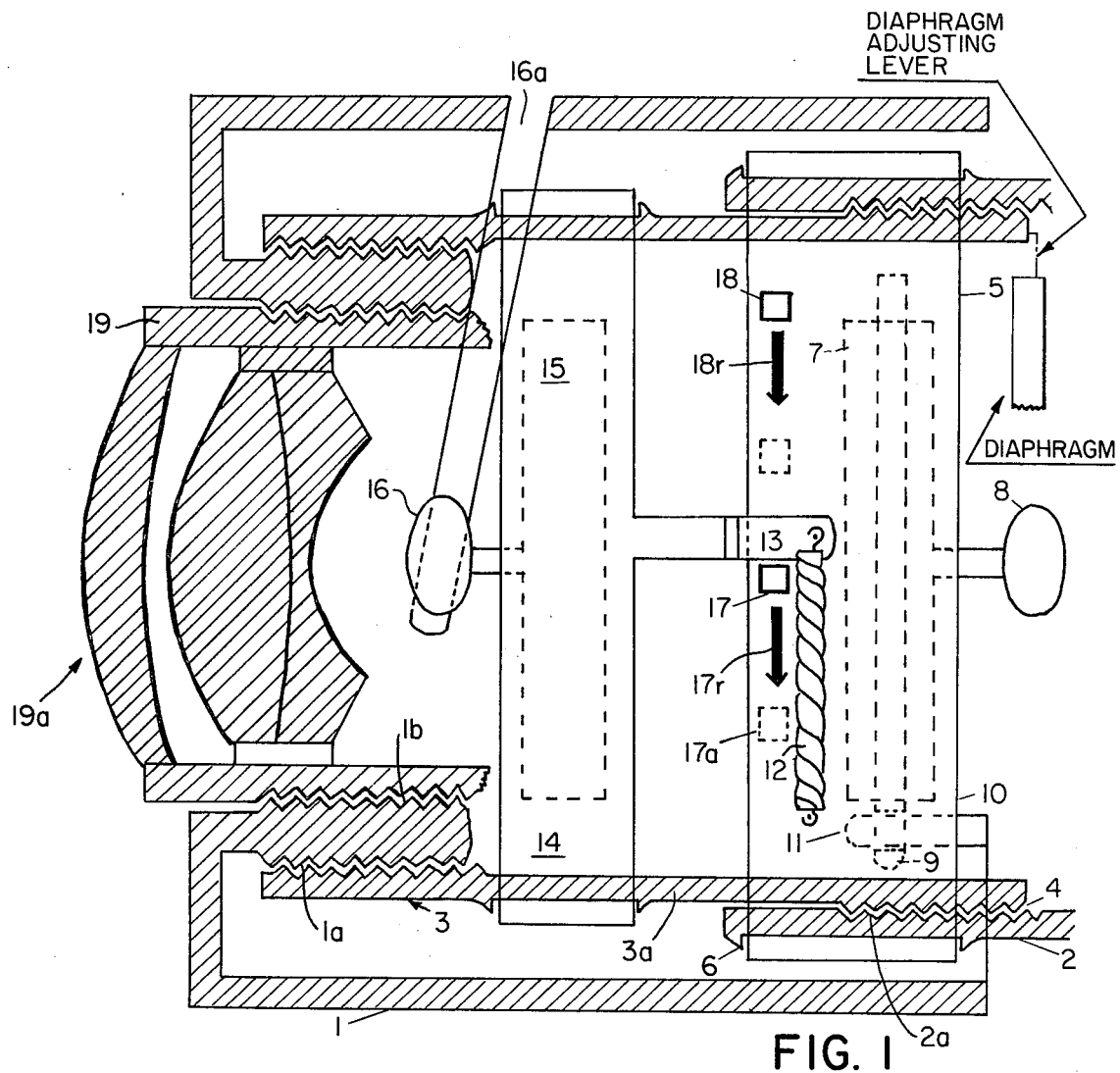
FIG. 1 is a schematic partly sectional view of an objective which embodies one form of the invention.
Figure 2:
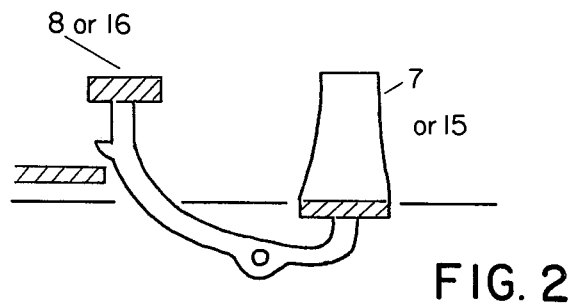
FIG. 2 illustrates a detail in the objective of FIG. 1.

FIG. 1 is a section through the improved objective with certain parts shown in elevation. This is a modern objective in which, in a manner similar to that in the Nikkor-H Auto 1:1.8 f=35 mm No. 23 73 19 lens, a knurled focusing ring 1 can be rotated to move the tube 19 for the lenses of the optical system 19a forwardly by means of two equally steep threads 1a 1b in order to advance the lenses through a distance approximating twice its own advance. The rotary member or sleeve 3a in which the external thread 1a of the knurled ring 1 is guided is threadedly connected to the base 2 of the objective (as at 2a, 4) in a manner known from conventional objectives. The base 2 is secured to the camera body, for instance by means of a slide lock. However, in the illustrated embodiment of the invention, this sleeve 3a is a composite body and the base 2 holds the sleeve 3a for the knurled ring 1 and optical elements or lenses of the system 19a (hereinafter called mount 3) by means of the thread 2a. This thread 2a has the same slope as the two threads 1a, 1b of the knurled ring 1. Upon completion of rotation in the direction indicated by the arrow 17r or 18r, the mount 3 is caused to perform a movement in a direction towards the camera housing through a distance which is exactly half the distance covered by the lenses if the angular movement of the tube 19 in the opposite direction amounts to the same number of degrees as that through which the knurled ring 1 was rotated while causing the lenses to move forwardly. In order to insure that the angular movement which is carried out by the knurled ring 1 from focusing of the one boundary point to focusing of the other boundary point is converted into an equally large angular movement of the mount 3 with respect to the base 2 of the objective, discrete information storing rings 5 and 14 are mounted on the base 2 and on the mount 3, respectively. The ring 5 is mounted in a guide 6 on the base 2. It can be arrested by a lock 7 on the base 2 in response to depression of an actuating button 8. FIG. 2 illustrates the arresting means in detail. A springy strip 9 having a detent notch or recess 10 is provided on the ring 5 and is engaged by an arm 11 of the knurled ring 1. A resilient element in the form of a helical spring 12 is installed between the right-hand ring 5 and the ring 14. This spring is secured on the one hand to the ring 5 and on the other hand to an arm 13 of the second ring 14. The arm 13 has freedom of movement with respect to the ring 5 through a distance which is determined by two abutments 17 and 18 and corresponds exactly to the distance between the two outermost graduations of an imaginary depth of field scale. Moreover, this distance (which can subtend an arc of 55°) is identical with the extent of movement which is needed to adjust the diaphragm from the largest aperture (1.8) to the smallest aperture (22). A prerequisite for the correspondence of the angular movement of the mount 3 with the required diaphragm closure is the operation of the diaphragm adjusting lever in such a way that, in order to change the diameter of the diaphragm aperture from one diameter to a diameter one and a half times the one diameter, the lever is moved through identical angles. This is the case in modern objectives such as, for instance, the Nikkor-H Auto 1:1.8 f=35 mm. The ring 14 can be arrested by a locking device 15 which is actuated by depressing a button or key 16. In order to make it accessible from the outside, the key 16 extends through a slot 16a of the knurled ring 1. The manner in which the key 16 can initiate a locking action is shown in FIG. 2. The mount 3 is directly connected to the diaphragm adjusting lever and is held in the normal position with respect to the base 2. In the illustrated embodiment, the thread 4 between the rotary member 3a of the mount 3 and the base 2 is designed for easy movement with respect to the threads of the knurled ring 1. In order that, during return movement of the mount 3, the threads of the knurled ring 1 remain in their positions, they are designed for hard movement.

The operation of the illustrated embodiment of the invention is as follows: The selected depth of field is assumed to be between 15 m and 3 m from the camera and, upon the depth of field adjustment, the objects within this range shall be imaged on the negative with stray circles not exceeding 1/30 mm. By means of the knurled ring 1, the farthest point at 15 m is focused. During this movement, for instance, from the infinity, the ring 5 of the base 2 is carried along because the knurled ring 1 has its arm 11 engaged in the notch 10 of the strip 9. Moreover, the spring 12 pulls the ring 14 by way of the arm 13 so that the arm 13 engages the abutment 17. When the image of an object located at the distance of 15 m becomes sharp, the key 16 is depressed. This key is very close to the left forefinger which was used to rotate the ring 1 together with the thumb of the left hand. The ring 14 is thereby locked against the mount 3. By means of the knurled ring 1, an object at a distance of 3 m is now sighted. When the image of the object becomes sharp, the key 8 is depressed, also with the left forefinger, and the grip upon the knurled ring 1 is relaxed. This locks the ring 5 to the base 2, and secondly the arm 11 of the knurled ring is disengaged. Together with the ring 5, the abutment 17 has moved to the position 17a, this causing the spring 12 to store energy. As soon as this has occurred, a lock (not shown) which caused the mount 3 to engage the base 2 is released so that the parts 2 and 3 can move with respect to each other. The spring 12 pulls the mount 3 into the base 2 to the extent determined by the space which is allotted by the stop 17 in the position 17a. The mount 3 returns through about half the distance and the diaphragm which is coupled thereto is adjusted accordingly. The camera is ready to make an exposure. In another embodiment, the lock for the mount 3 is disengaged only when actuating the camera release. In such embodiment, a fully automatic diaphragm is superfluous since it remains open anyway until the camera release is actuated. Regardless of whether the one or the other embodiment is resorted to, several shots of the same depth of field can be made in response to repeated winding of film and actuation of the camera release. When another range is to be selected, the knurled ring 1 is returned in a direction towards the infinity. Its arm 11 soon enters the recess 10 of the strip 9 and thereby releases the lock 7 by way of a lever, not shown. The knurled ring 1 now again carries along the locking arrangement 7 on the ring 5. Shortly thereafter, the abutment 17 contacts the arm 13 as soon as it reaches the solid-line position of FIG. 1 whereby the ring 14 on the mount 3 is unlocked by means of a releasing lever, not shown. The ring 14 is now free to move again with the knurled ring 1, either in response to a push by the abutment 17 or in response to a pull by the spring 12, depending upon whether the ring 1 moves forwardly or backwards. Thus, the farthest point of another depth of field range can be focused out.

The objective can be designed to indicate that the selected range of the depth of field is too wide and to correct this by engagement against suitable abutments. The objective is also useful for exposures without any depth of field as well as for exposures with maximum sharpness outside of the point midway between the two boundary points. In the latter case, refocusing is necessary either by maintaining the mount 3 in engagement with the abutment or by providing a lock which locks the arm 13 when the arm contacts the abutment 17 in the position 17a.

The invention is claimed as follows:

1. A method of preparing a photographic camera for the making of exposures of objects within a selected depth of field range between two boundary points, comprising the steps of focusing the lens system of the objective upon one of said boundary points, including moving the lens system in the direction of the optical axis to a first position; storing in the objective information denoting said first position; focusing the lens system upon the other boundary point, including moving the lens system of the objective in the direction of the optical axis to a second position; storing in the objective information denoting said second position; and thereupon utilizing the stored information denoting said first and second positions to automatically shift the lens system to an exposure position substantially midway between said first and second positions.

2. A method as defined in claim 1, further comprising the step of adjusting the diaphragm of the photographic camera in automatic response to shifting of the lens system to said exposure position so that the aperture size is a function of the exposure position of the lens system.

3. An objective for photographic cameras, comprising an optical system; means for focusing said optical system upon objects located at different distances from the objective, including means for moving said optical system in the direction of the optical axis; means in the objective for storing information pertaining to various positions of said optical system; means for actuating said information storing means; and means for automatically shifting said optical system to an exposure position substantially midway between spaced-apart first and second positions in each of which said information storing means was actuated so that the photographic camera embodying the objective is ready to make an exposure of objects located within the depth of field range bounded by points upon which said system was focused in said first and second positions thereof.

4. An objective as defined in claim 3, further comprising an adjustable diaphragm and means for adjusting said diaphragm in response to shifting of said optical system to said exposure position.

5. An objective as defined in claim 4, wherein said shifting means includes resilient means.

6. An objective as defined in claim 4, wherein said optical system comprises a rotary member and further comprising a base member supporting said rotary member, said information storing means including first and second rings respectively supported by said rotary member and said base member, each of said rings being rotatable relative to the associated member and said actuating means including arresting means for interrupting the rotary movements of said rings, said shifting means including means for turning said rotary member to the extent determined by relative angular positions of said rings upon interruption of the rotary movement thereof.

7. An objective as defined in claim 6, wherein said means for turning said rotary member includes a spring, one of said rings having an arm and the other of said rings having abutment means in the path of movement of said arm, said spring being arranged to move said arm against said abutment means or vice versa on disengagement of one of said arresting means.

* * * * *